(12) United States Patent
Mandalia (10) Patent No.: US 6,636,890 B1
(45) Date of Patent: *Oct. 21, 2003

(54) STAND-ALONE INTERNET MAILBOX FOR CABLE SUBSCRIBERS

(75) Inventor: Baiju D. Mandalia, Boca Raton, FL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,379

(22) Filed: Nov. 28, 1997

(51) Int. Cl.$^7$ ............................................. G06F 15/16
(52) U.S. Cl. ...................................... 709/206; 709/245
(58) Field of Search ................................ 709/206, 245, 709/238, 227, 207, 249, 229; 348/6, 7, 13, 10, 9; 370/352, 389, 312, 432, 328, 338, 343, 349, 419, 421; 358/1.15; 707/10; 725/105, 109–111, 114, 115, 139

(56) References Cited

U.S. PATENT DOCUMENTS

| | | | |
|---|---|---|---|
| 4,695,880 A | * | 9/1987 | Johnson et al. ................. 348/6 |
| 5,414,773 A | * | 5/1995 | Handelman .................... 348/6 |
| 5,489,894 A | * | 2/1996 | Murray ....................... 340/7.32 |
| 5,557,320 A | * | 9/1996 | Krebs .......................... 348/13 |
| 5,714,943 A | * | 2/1998 | Rasor | |
| 5,862,339 A | * | 1/1999 | Bonnaure et al. ............ 709/227 |

(List continued on next page.)

FOREIGN PATENT DOCUMENTS

| | | | |
|---|---|---|---|
| EP | 0880252 A1 | * | 11/1998 |
| WO | 99/26374 | * | 5/1999 |

OTHER PUBLICATIONS

Hernandez–Valencia, Enrique J., "Architectures for Broadband Residential IP Services Over CATV Networks", IEEE Network, pp. 36–43, Jan. 1997.*

Primary Examiner—Mark Powell
Assistant Examiner—Marc D. Thompson
(74) Attorney, Agent, or Firm—Akerman Senterfitt (57) ABSTRACT

A method for delivering electronic mail (e-mail) messages over a cable television distribution network comprises the steps of: accepting e-mail messages addressed to e-mail subscribers of the cable television distribution network; respectively associating each the e-mail message with data identifying one of the subscribers; adding an address header from the data identifying the subscribers to each the e-mail message corresponding to the premises of the respective e-mail subscriber; transmitting the e-mail messages and address headers for transmission over the cable distribution network simultaneously with television signals but in a predefined frequency band not carrying the television signals; receiving all e-mail messages transmitted over of the cable television distribution network at each respective premises of the e-mail subscribers; decoding the address headers of the e-mail messages; determining from the address headers whether the e-mail message is addressed to the respective premises; and, if the e-mail is addressed to the respective premises, displaying the e-mail message. The e-mail message can be encrypted prior to transmission with a code from the data identifying the respective subscriber and subsequently decrypting at the subscriber's premises. A stand-alone mailbox for receiving the e-mail messages comprises: a demodulator for receiving all e-mail messages transmitted over of the cable television distribution network; a decoder for the address headers and the e-mail messages; a comparator for determining if the address header of any of the e-mail messages matches an address of the premises for which the mailbox is coded; and, a display for the e-mail messages.

23 Claims, 5 Drawing Sheets

U.S. PATENT DOCUMENTS

| | | | |
|---|---|---|---|
| 5,761,602 A | * 6/1998 | Wagner et al. | 725/110 |
| 5,777,605 A | * 7/1998 | Yoshinobu et al. | 345/173 |
| 5,790,806 A | * 8/1998 | Koperda | 709/252 |
| 5,796,394 A | * 8/1998 | Wicks et al. | 709/206 |
| 5,812,931 A | * 9/1998 | Yuen | 725/123 |
| 5,826,269 A | * 10/1998 | Hussey | 709/206 |
| 5,850,218 A | * 12/1998 | LaJoie et al. | 348/13 |
| 5,870,549 A | * 2/1999 | Bobo, II | 709/206 |
| 5,896,414 A | * 4/1999 | Meyer et al. | 375/222 |
| 5,930,475 A | * 7/1999 | Yashiro et al. | 709/217 |
| 5,930,479 A | * 7/1999 | Hall | 709/238 |
| 5,930,702 A | * 7/1999 | Goldman et al. | 348/9 |
| 5,938,725 A | * 8/1999 | Hara | 709/206 |
| 5,938,726 A | * 8/1999 | Reber et al. | 709/217 |
| 5,941,946 A | * 8/1999 | Baldwin et al. | 709/206 |
| 5,944,786 A | * 8/1999 | Quinn | 709/206 |
| 5,951,638 A | * 9/1999 | Hoss et al. | 709/206 |
| 5,956,521 A | * 9/1999 | Wang | 710/35 |
| 5,983,273 A | * 11/1999 | White et al. | 709/229 |
| 5,987,503 A | * 11/1999 | Murakami | 709/206 |
| 5,991,799 A | * 11/1999 | Yen et al. | 709/218 |
| 6,012,088 A | * 1/2000 | Li et al. | 709/219 |
| 6,023,700 A | * 2/2000 | Owens et al. | 707/10 |
| 6,025,931 A | * 2/2000 | Bloomfield | 358/402 |
| 6,044,382 A | * 3/2000 | Martino | 707/505 |
| 6,052,709 A | * 4/2000 | Paul | 709/202 |
| 6,058,430 A | * 5/2000 | Kaplan | 709/245 |
| 6,061,502 A | * 5/2000 | Ho et al. | 358/1.15 |
| 6,081,533 A | * 6/2000 | Laubach et al. | 370/421 |
| 6,138,096 A | * 10/2000 | Chan et al. | 704/235 |
| 6,172,763 B1 | * 1/2001 | Toyoda et al. | 358/1.15 |
| 6,208,656 B1 | * 3/2001 | Hrastar et al. | 370/401 |

* cited by examiner

STAND-ALONE INTERNET MAILBOX FOR CABLE SUBSCRIBERS

BACKGROUND OF THE INVENTION

1. Field of the Invention

This invention relates to the field of electronic mail (e-mail) communications, and in particular, to a stand-alone Internet mailbox which utilizes cable television signal distribution networks for delivering e-mail messages

2. Description of Related Art

Internet e-mail is transmitted today through the Internet and has become a common form of communication. Using devices like personal computers and web-tv the process to receive the e-mail is getting simpler. Despite these facilities, the process for receiving e-mail remains expensive and complex, particularly for persons having little technical aptitude or interest. A is modem is required to connect to the Internet. A monthly charge is paid for the access. The knowledge of operating special devices is required. The inability of many persons to even receive e-mail is an inconvenience to other people desiring to send e-mail messages, even knowing that an e-mail reply will not be forthcoming. On the other hand, virtually everyone owns a television and many of these people, in ever increasing numbers, are wired or wireless subscribers to cable and satellite services.

SUMMARY OF THE INVENTION

In accordance with the inventive arrangements, an electronic mailbox facility is embodied in a simple device that can receive a data stream representing an e-mail communication from a cable television distribution system or satellite system. The device then formats that data stream into an e-mail letter which can, for example, be either printed as a continuous output of the device or displayed in a simple display having a page up/page down capability for enabling the e-mail to be read.

It is not anticipated that the television would be incorporated into the display, as an underlying aspect of the invention is to simplify the reception of e-mail to such an extent that, except for using a cable splitter to connect the device to the coaxial cable in the home, no technical steps need be undertaken, as would be necessary if the operation of the television were impacted in any fashion. It is also an underlying aspect of the invention that the television need not be operating in order to receive or read an e-mail message. Simplicity is the key factor.

A method in accordance with an inventive arrangement for delivering electronic mail (e-mail) messages over a cable television distribution network, comprises the steps of: (a.) accepting an e-mail message addressed to an e-mail subscriber of the cable television distribution network; (b.) associating the e-mail message with data identifying the subscriber; (c.) adding an address header from the data identifying the subscriber to the e-mail message corresponding to premises of the e-mail subscriber; and, (d.) transmitting the e-mail message and address header for transmission over the cable distribution network simultaneously with television signals but in a predefined frequency band not carrying the television signals, whereby the e-mail message and header can be captured by an e-mail message receiver in the premises of the subscriber by decoding the address header.

The method can further comprising the step of, between the steps (b.) and (c.), encrypting the e-mail message with a code from the data identifying the subscriber.

A method in accordance with another inventive arrangement for receiving electronic mail (e-mail) messages over a cable television distribution network, transmitted with an address header over a cable distribution network simultaneously with television signals, comprises the steps of: (a.) receiving all e-mail messages transmitted over of the cable television distribution network at each premises of e-mail subscribers; (b.) decoding the address headers of the e-mail messages; (c.) determining from the address header whether the e-mail message is addressed to the premises of the e-mail subscriber; and, (d.) if the e-mail is addressed to the premises of the e-mail subscriber, displaying the e-mail message.

The method can further comprising the step of first demodulating the e-mail messages from a predefined frequency band of the cable distribution network not carrying television signals.

The method can further comprise the step of displaying the e-mail message by printing the e-mail message and/or displaying the e-mail message by scrolling the e-mail message on an alpha numeric display.

The method can also further comprise the step of, between the steps (c.) and (d.), decrypting the e-mail message.

The method can also further comprise the step of storing the e-mail message prior to displaying the e-mail message.

A method in accordance with yet another inventive arrangement for delivering electronic mail (e-mail) messages over a cable television distribution network, comprising the steps of:(a.) accepting e-mail messages addressed to e-mail subscribers of the cable television distribution network; (b.) respectively associating each the e-mail message with data identifying one of the subscribers; (c.) adding an address header from the data identifying the subscribers to each the e-mail message corresponding to the premises of the respective e-mail subscriber; (d.) transmitting the e-mail messages and address headers for transmission over the cable distribution network simultaneously with television signals but in a predefined frequency band not carrying the television signals; (e.) receiving all e-mail messages transmitted over of the cable television distribution network at each respective premises of the e-mail subscribers; (f.) decoding the address headers of the e-mail messages; (g.) determining from the address headers whether the e-mail message is addressed to the respective premises; and, (h.) if the e-mail is addressed to the respective premises, displaying the e-mail message.

The method can further comprise the steps of: between the steps (b.) and (c.), respectively encrypting the e-mail messages with a code from the data identifying the respective subscriber; and, between the steps (g.) and (h.), decrypting the e-mail message.

The method can also further comprise the step of storing the e-mail messages prior to displaying the messages. displaying the e-mail messages by printing the e-mail messages.

The method can further comprise the step of displaying the e-mail message by printing the e-mail message and/or displaying the e-mail message by scrolling the e-mail message on an alpha numeric display.

A stand-alone mailbox in accordance with yet another inventive arrangement for receiving electronic mail (e-mail) messages transmitted over a cable television distribution network to each premises of a plurality of e-mail subscribers, transmitted with an address header over a cable distribution network simultaneously with television signals, comprises: a demodulator for receiving all e-mail messages transmitted over of the cable television distribution network; a decoder for the address headers and the e-mail messages; a comparator for determining if the address header of any of the e-mail messages matches an address of the premises for which the mailbox is coded; and, a display for the e-mail messages.

The mailbox can further comprising a decrypter for the decoded messages.

The mailbox can further comprise a memory for storing the e-mail messages.

The mailbox can also comprise a printer for displaying the e-mail messages and/or a scrollable alpha numeric display for displaying the e-mail messages.

DETAILED DESCRIPTION OF THE PREFERRED EMBODIMENTS

In accordance with the inventive arrangements, each television cable substation is connected to an Internet mail server. A mail server maintains a table of subscriber identifying data (ID's) for people who are served by the cable station. The mail server picks all e-mail for the area served and sends the e-mail to the cable transmission device used for the television signals. The cable transmission device uses specially assigned data bands to broadcast all the e-mail to each of the e-mail subscribers. Each e-mail is encrypted according to a subscriber selected encryption key prior to being broadcast over the cable distribution network.

Figure 1:
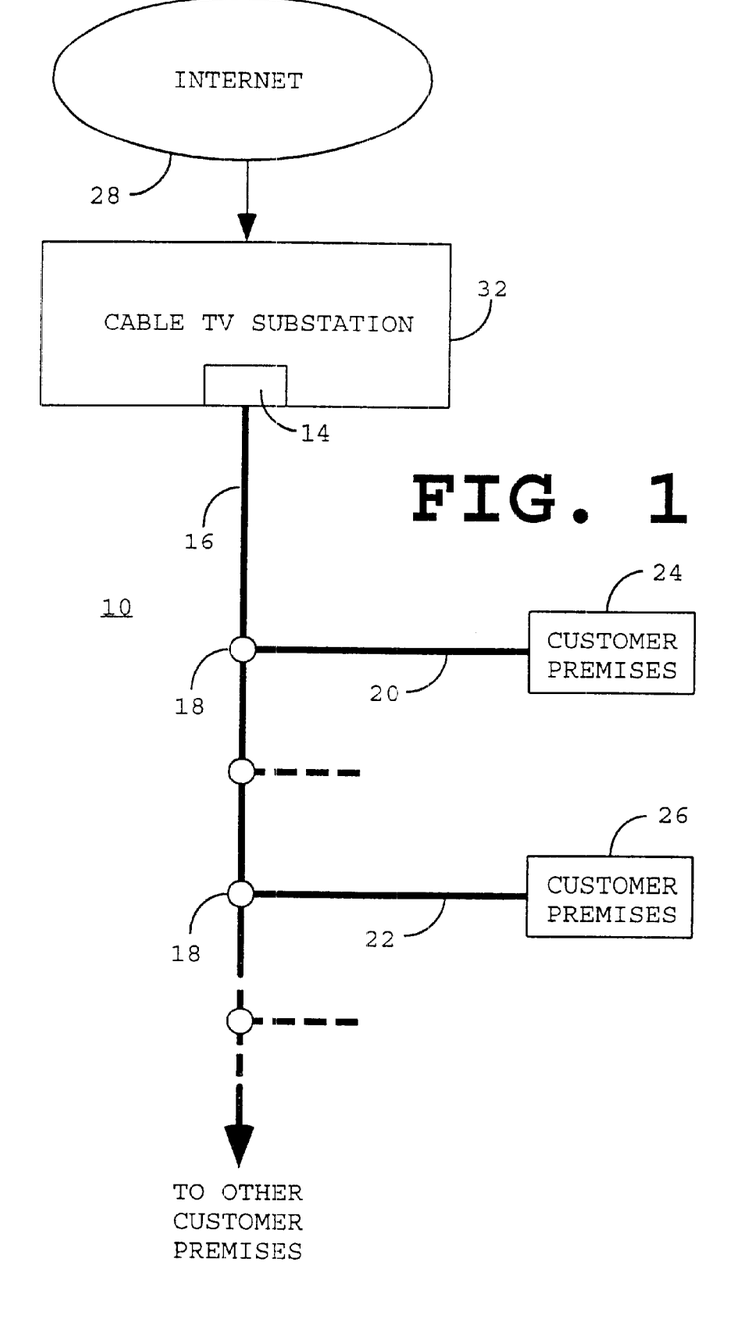
FIG. 1 is a block diagram illustrating a cable distribution system adapted for electronic mail delivery in accordance with the inventive arrangements.

An illustrative arrangement 10 of a television cable substation 12 in accordance with the inventive arrangements is shown in FIG. 1. As part of the television signal distribution system, the substation has a cable transmission device 14 that transmits television signals onto a coaxial cable transmission line network 16. The transmission network has a plurality of junction points 18, from which coaxial cable or hybrid cable transmission lines branch into the premises of respective customers. Branch line 20 connects to premises 24, branch line 22 connects to premises 26, and so on. It will be appreciated that the network 16 can have intermediate trunks and branches, not shown, between the main trunk and the premises of the customers. In accordance with the inventive arrangements, the substation 12 is also connected to the Internet 28.

Figure 2:
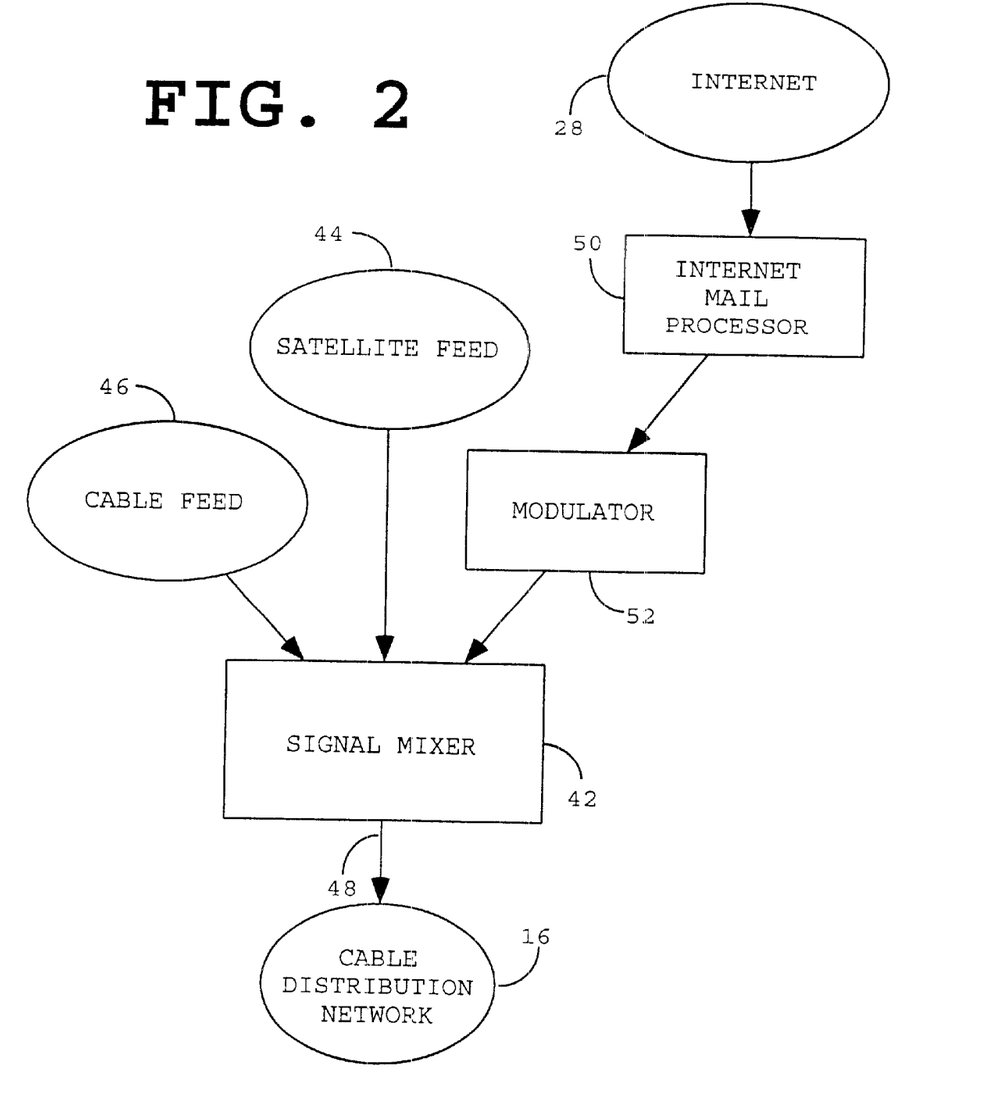
FIG. 2 is a block diagram illustrating signal mixing in the cable distribution system shown in FIG. 1.

An illustrative signal mixing arrangement 40 for the cable distribution system is shown in FIG. 2. A signal mixer 42 receives a satellite feed 44 and a cable feed 46. The mixer 42 supplies a master feed signal to the main trunk 48 of the network 16. In accordance with the inventive arrangements, the mixer also receives an input signal from the Internet 28 through an Internet mail processor 50 and a modulator 52.

Figure 3:
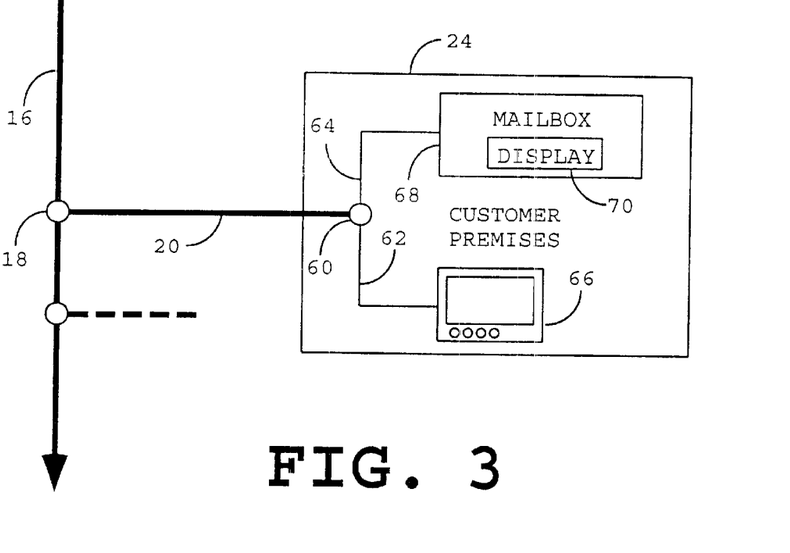
FIG. 3 is a block diagram illustrating connection of a stand-alone electronic mailbox to a cable distribution system in a customer's premises.

An illustrative diagram of a customer's premises 24 is shown in FIG. 3. The cable branch line 20 enters the premises and is coupled to a signal splitter 60. A first branch line 62 from the splitter is coupled to a television 66. In accordance with the inventive arrangements, a second branch line 64 is coupled to a stand-alone mailbox 70. Mailbox 70 includes a display device 72. It will be appreciated that the splitter can be in proximity to the television 66, perhaps resting thereon. The splitter can also be the main splitter for distributing cable in the premises, in which case the mail box can be located anywhere a cable jack is available. The only desirable limitation would be for the mailbox to be located in which the reception of e-mail is likely to be noticed by the customer. In this regard, the mailbox can be adapted to emit a signal and/or flash a light when e-mail has been received.

Figure 4:
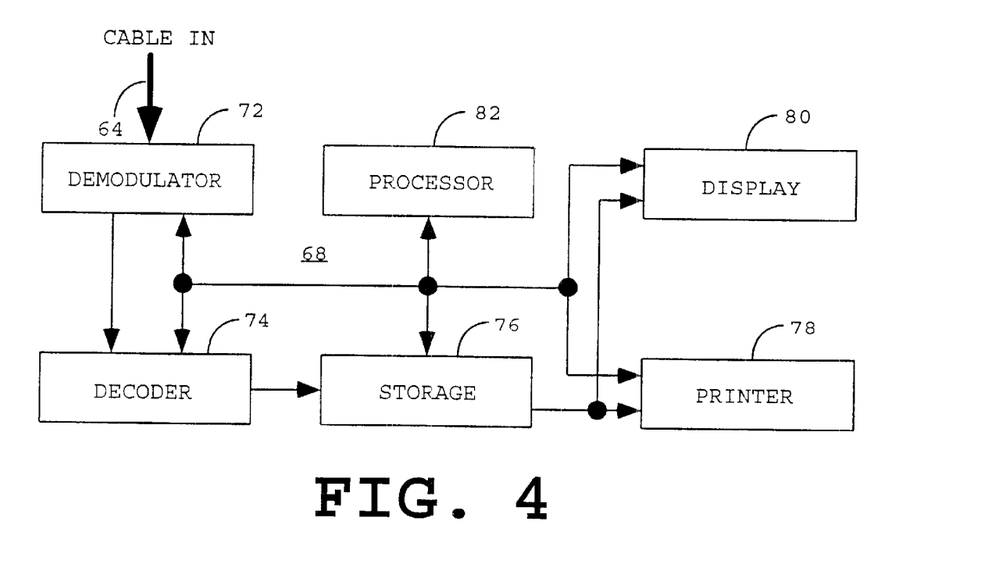
FIG. 4 is a block diagram of the stand-alone electronic mailbox shown in FIG. 3.
Figure 6:
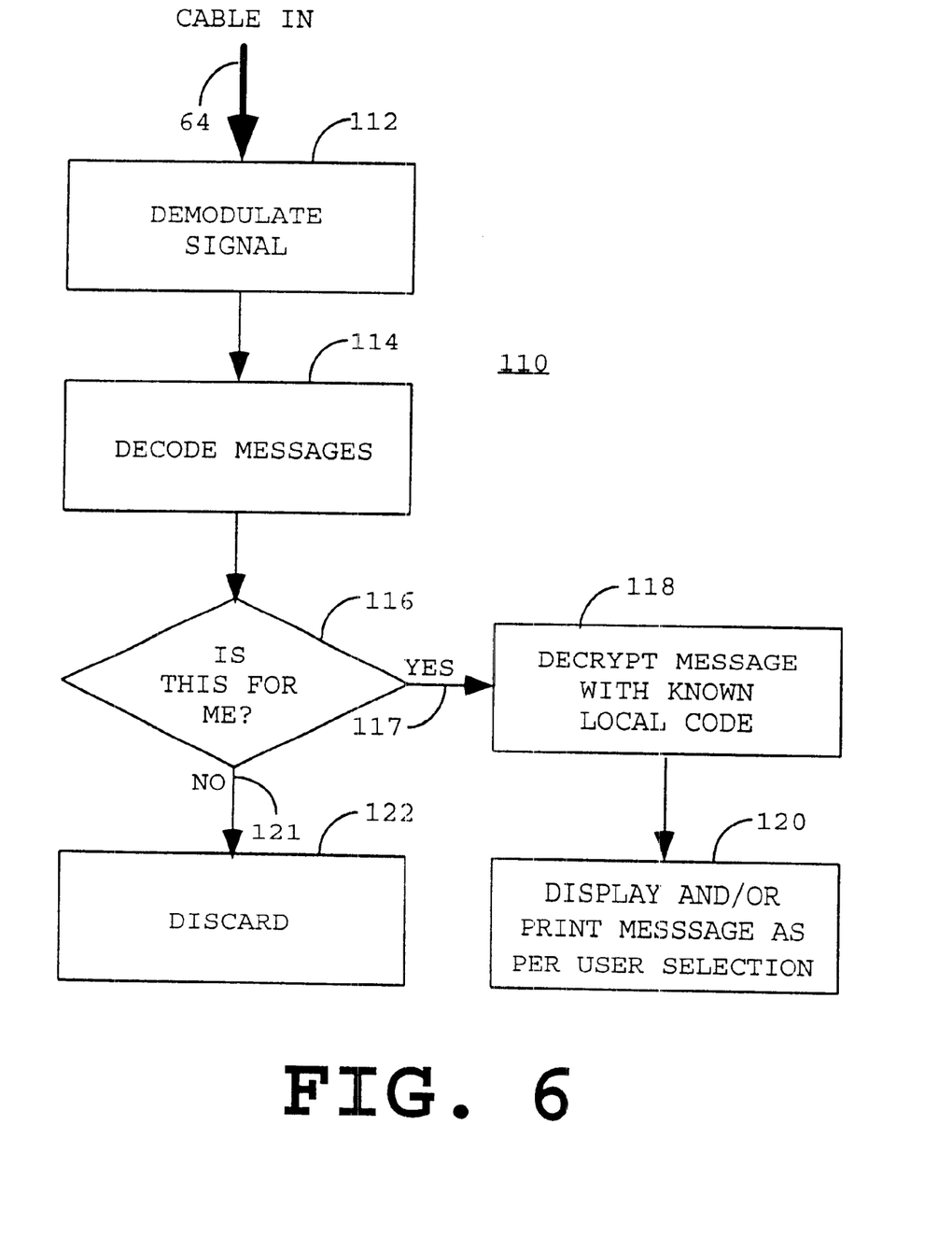
FIG. 6 is a flow chart useful for explaining data processing in the stand-alone electronic mailbox.

The mail box has a built-in television demodulator to extract the data band on which the e-mail is delivered. Based on subscriber ID information, the mailbox captures, decodes, decrypts and stores the mail which is broadcast to it. Standard Internet protocol (IP) communication can be used to receive the mail and the software stack can be integrated into the micro code of the mailbox processor. A block diagram of the stand-alone electronic mailbox 68 is shown in FIG. 4. A demodulator 72 receives signals from the branch line 64. A decoder 74 decodes the e-mail message, which after decryption, described in connection with FIG. 6, is then stored in a storage register 76. Display device 72 can be embodied, for example, by a built-in cash register type printer 78 to print continuous e-mail and/or by a small character display 80, for example an LCD display, that can be scrolled using simple control buttons to view the e-mail. Displaying and printing is under the control of a microprocessor 82, responsive to user controls, not shown. Microprocessor 82 can also control operation of the demodulator and decoder, for example denoting different operating frequency bands and/or loading different decryption schemes as necessary.

Figure 5:
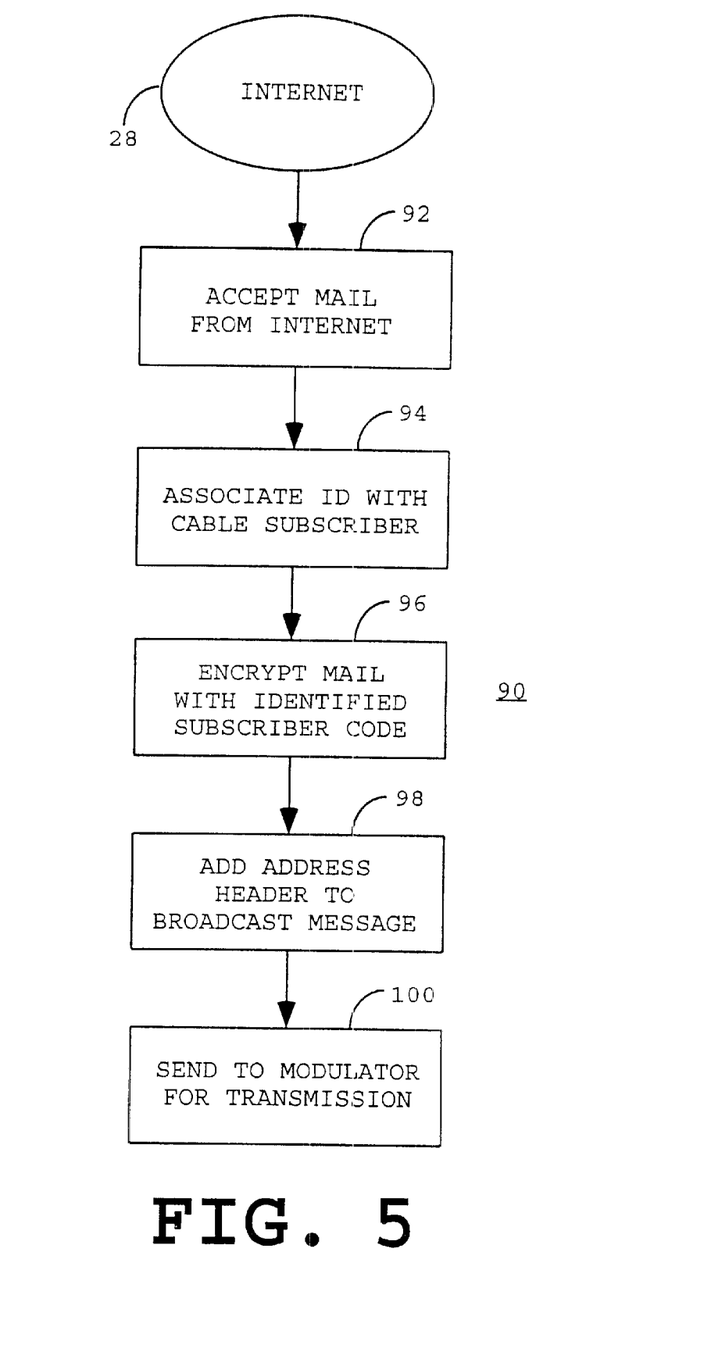
FIG. 5 is a flow chart useful for explaining data processing in a television cable substation in accordance with the inventive arrangements.

FIG. 5 is a flow chart 90 useful for explaining data processing in the cable substation. Starting at block 92, an e-mail message is accepted from the Internet. The e-mail message is associated with a cable subscriber ID in accordance with block 94. The message together with the subscriber ID is encrypted in accordance with block 96 and sent to block 98 for addition a header of the broadcast message for proper routing. The e-mail message is finally sent to the modulator for transmission in accordance with block 100.

FIG. 6 is a flow chart useful for explaining data processing in the mailbox. Starting at block 112, the signal into the mailbox is demodulated, and then decoded in accordance with block 114. A determination is then made in decision block 116 as to whether the message is for the particular subscriber. This determination is made by examining the subscriber ID information in the header. If the message is for the subscriber, path 117 branches to block 118, in accordance with which the message is decrypted with a local code unique to the subscriber. Finally the message is displayed and/or printed in accordance with block 120.

What is claimed is:

1. A method for delivering electronic mail (e-mail) messages over a cable television distribution network, comprising the steps of:

(a.) receiving in said cable television distribution network, an Internet addressed e-mall message addressed to an e-mail subscriber of said cable television distribution network, wherein said receiving step is performed without assistance from a mail server in said cable television distribution network;

(b.) responsive to receiving said Internet addressed e-mall message, associating said Internet addressed e-mail message with a cable subscriber identifier, adding a cable network address header based on said cable subscriber identifier to said e-mail message corresponding to the premises of said e-mail subscriber, and modulating said e-mail message and cable network address header in a cable television signal over said cable distribution network simultaneously with other cable television signals but in a predefined frequency band not configured to carry said cable television signals;

(c.) demodulating said e-mail message and cable network address header in said cable television signal in a stand-alone e-mail message receiver in said premises of said subscriber by decoding said address header, said stand-alone receiver having a single one-way communicative link from said Internet through said cable television distribution network; and, (d.) displaying said e-mall message in said stand-alone e-mail message receiver operating without requiring concurrent operation of an external output device.

2. The method of claim 1, further comprising the step of, between said steps (b.) and (c.), encrypting said e-mail message with a code from said data identifying said subscriber.

3. A method for receiving Internet addressed electronic mail (e-mail) messages over a cable television distribution network, transmitted with an address header over a cable distribution network simultaneously with television signals, comprising the steps of:

(a.) receiving at each premises of e-mail subscribers in a corresponding stand-alone mailbox without assistance from a mail server in the cable distribution network an Internet addressed e-mail message which has been modulated in a cable television signal and broadcast over said cable television distribution network simultaneously with other cable television signals but in a predefined frequency band not configured to carry said cable television signals, together with a cable network subscriber identifier appended to said e-mail message, said stand-alone mailbox having a single one-way communicative link from said Internet through said cable distribution network;

(b.) demodulating said modulated cable television signal and decoding said cable network subscriber identifier;

(c.) determining whether said cable network subscriber identifier corresponds to said premises of said e-mail subscriber; and, (d.) if said cable network subscriber identifier corresponds to said premises of said e-mail subscriber, displaying in said stand-alone mailbox said e-mail message without requiring concurrent operation of an external output device.

4. The method of claim 3, comprising the step of displaying said e-mail message by printing said e-mail message.

5. The method of claim 3, comprising the step of displaying said e-mail message by scrolling said e-mail message on an alpha numeric display.

6. The method of claim 3, further comprising the step of, between said steps (c.) and (d.), decrypting said e-mail message.

7. The method of claim 6, further comprising the step of storing said e-mail message prior to displaying said e-mail message.

8. The method of claim 3, further comprising the step of storing said e-mail message prior to displaying said e-mail message.

9. A method for delivering electronic mail (e-mail) messages over a cable television distribution network, comprising the steps of:

(a.) receiving in said cable television distribution network, Internet addressed e-mail messages addressed to e-mail subscribers of said cable television distribution network, wherein said receiving step is performed without assistance from a mail server in said cable television distribution network;

(b.) responsive to said receiving step, respectively associating each Internet address of each said e-mail message with a cable network subscriber identifier identifying one of said subscribers, adding to each said e-mail message a cable network address header corresponding to the premises of said respective e-mail subscriber, said cable network address header based on said cable network subscriber identifier, and modulating said e-mail message, cable network subscriber identifier and cable network address headers in cable television signals over said cable distribution network simultaneously with other cable television signals but in a predefined frequency band not configured to carry said cable television signals;

(c.) receiving without assistance from a mail server in said cable distribution network all said modulated e-mail messages broadcast over said cable television distribution network in stand-alone mailboxes at each respective premises of said e-mall subscribers, each said stand-alone mailbox having a single one-way communicative link from said Internet through said cable distribution network;

(d.) demodulating said modulated e-mail messages and decoding said cable network address headers of said e-mail messages in said stand-alone mailboxes;

(e.) determining in said stand-alone mailboxes from said cable network address headers whether any of said e-mail messages are addressed to said respective premises; and, (f.) if an e-mail is addressed to said respective premises, displaying in a corresponding stand-alone mailbox said e-mail message addressed to said respective premises without requiring concurrent operation of an external output device.

10. The method of claim 9, further the steps of:

between said steps (b.) and (c.), respectively encrypting said e-mail messages with a code from said data identifying said respective subscriber; and, between said steps (e.) and (f.), decrypting said e-mail message.

11. The method of claim 10, further comprising the step of storing said decrypted e-mail messages prior to displaying said messages.

12. The method of claim 11, comprising the step of displaying said e-mail messages by printing said e-mail messages.

13. The method of claim 11, comprising the step of displaying said e-mail messages by scrolling said e-mail messages on an alpha numeric display.

14. The method of claim 10, comprising the step of displaying said e-mail messages by printing said e-mail messages.

15. The method of claim 10, comprising the step of displaying said e-mail messages by scrolling said e-mail messages on an alpha numeric display.

16. The method of claim 9, further comprising the step of storing said e-mail messages prior to displaying said messages.

17. The method of claim 9, comprising the step of displaying said e-mail messages by scrolling said e-mail messages on an alpha numeric display.

18. A stand-alone mailbox for receiving Internet addressed electronic mail (e-mail) messages transmitted over a cable television distribution network to each premises of a plurality of e-mail subscribers, each said e-mail message transmitted with a network subscriber identifier appended to each said e-mail message, said e-mall messages transmitted over a cable distribution network simultaneously with television signals, comprising:

- a demodulator for receiving without assistance from a mail server in said cable television distribution network, Internet addressed e-mail messages modulated in cable television signals and transmitted over said cable television distribution network simultaneously with other cable television signals, but in a predefined frequency band not configured to carry said cable television signals, together with a cable network subscriber identifier appended to each said e-mail message;

- a decoder for decoding said cable network subscriber identifiers of said e-mail messages;

- a comparator for determining if said cable network subscriber identifiers of said e-mail messages corresponds to said premises for which said mailbox is coded; and,

- a display for said e-mail messages,

- said stand-alone mailbox operating each of said demodulator, decoder comparator and display without requiring concurrent operation of an external output device, said stand-alone mailbox having a single one-way communicative link from said Internet through said cable television distribution network.

19. The mailbox of claim 18, further comprising a decrypter for said decoded messages.

20. The mailbox of claim 19, further comprising a memory for storing said decrypted e-mail messages.

21. The mailbox of claim 18, further comprising a memory for storing said decoded e-mail messages.

22. The mailbox of claim 18, comprising a printer for displaying said e-mail messages.

23. The mailbox of claim 18, comprising a scrollable alpha numeric display for displaying said e-mail messages.

* * * * *